Aug. 20, 1968   N. T. JENSEN   3,397,618
VARIABLE SPEED REVERSIBLE ROTARY HYDRAULIC POWER TRANSMISSION
Filed Oct. 21, 1965
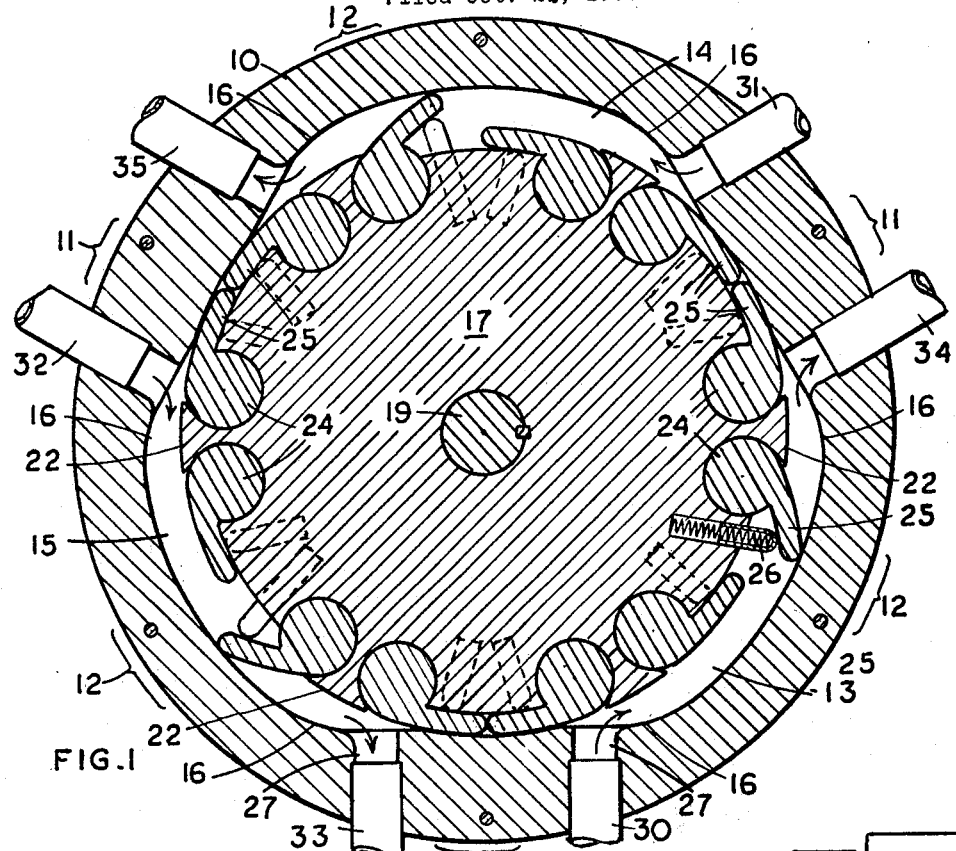
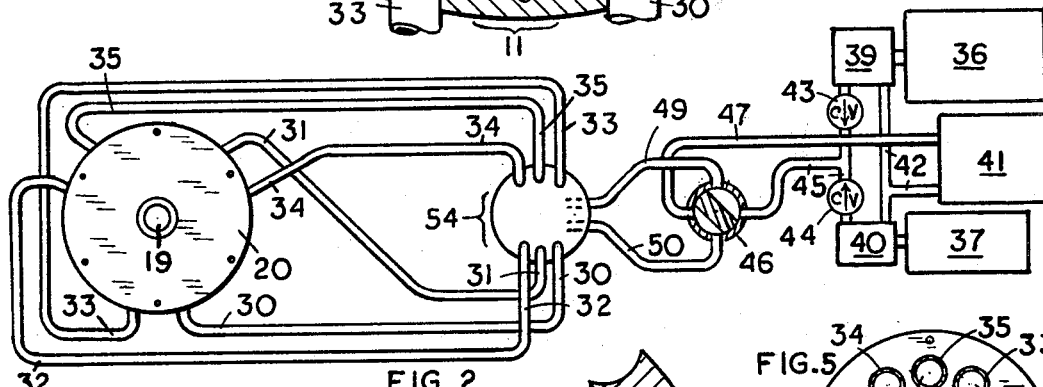
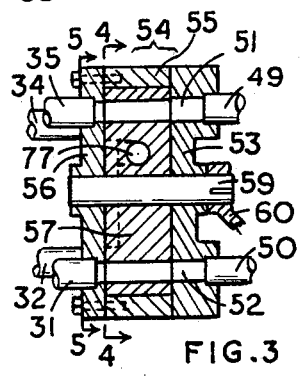
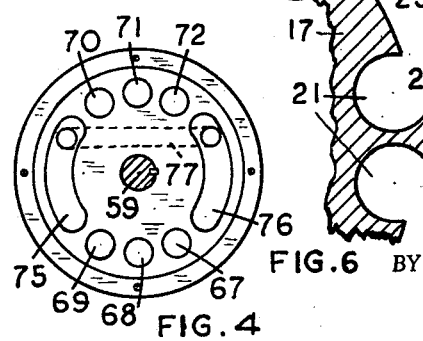
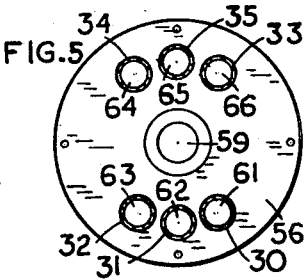
INVENTOR.
NEIL T. JENSEN
BY *Fred C. Matheny*
ATTORNEY

United States Patent Office 3,397,618
Patented Aug. 20, 1968

3,397,618
VARIABLE SPEED REVERSIBLE ROTARY
HYDRAULIC POWER TRANSMISSION
Neil T. Jensen, 1621 Larrabee Road,
Bellingham, Wash. 98225
Filed Oct. 21, 1965, Ser. No. 500,101
1 Claim. (Cl. 91—149)

ABSTRACT OF THE DISCLOSURE

An approximately cylindrical housing contains a rotor carrying swinging vanes which face in opposite directions to make the rotor reversible. Two or more power chambers are formed between the rotor and housing walls and a liquid conduit connects with each end of each power chamber. All of the conduits are connected through a distributing valve and a reversing valve with a pump and reservoir. The distributing valve will direct all of the liquid from the pump through one power chamber for high speed operation or divide the oil between two or more chambers for lower speed operation and short out all chambers not receiving liquid pressure. The reversing valve will reverse the transmission by reversing the direction of liquid flow.

My invention relates to a variable speed reversible rotary hydraulic power transmission.

An object of my invention is to provide a hydraulic power transmission of simple and rugged construction which will deliver high torque at low rotary speed without the use of gears and is especially well adapted for heavy-duty service.

Another object is to provide a variable speed rotary hydraulic power transmission which uses the entire available supply of oil under pressure at all times and does not have any devices for restricting the flow of oil to vary the speed, thus obviating heat problems common to hydraulic power transmissions in which the flow of oil is restricted in providing speed variations.

Another object is to provide a variable speed reversible rotary power transmission which can be used on small boats to replace both the usual reverse gear and the usual speed reduction gear and which is especially well adapted for use on fishing boats having two engines, one of larger size for travel and the other of smaller size for trolling or otherwise working the boat.

Another object is to provide a rotary hydraulic power transmission having a plurality of power chambers and having fluid pressure supply means connected with said puower chambers, said fluid pressure supply means being capable of being selectively operated to cut off the supply of fluid under pressure to at least one of said power chambers and to provide a fluid bypass between two conduits leading to each chamber from which the supply of fluid under pressure is cut off.

Another object is to provide a rotary hydraulic power transmission comprising a tubular housing of generally cylindrical internal shape having at least two angularly spaced apart inner wall portions of smaller diameter separated by at least two inner wall portions of larger diameter forming power chambers, said housing having within it a peripherally recessed rotor of generally cylindrical shape and having at least two angularly spaced apart peripheral portions of larger diameter between which are peripheral portions of smaller diameter, said rotor carrying a plurality of swingingly mounted vanes against which fluid under pressure reacts to provide rotation.

Other objects will be apparent from the following description and accompanying drawings.

In the drawings FIGURE 1 is a view in cross section of my hydraulic power transmission.

FIGURE 2 is a hydraulic diagram illustrative of one method of use of my transmission.

FIGURE 3 is a cross sectional view of a distributing valve shown in FIGURE 2 and which may be used in connection with my transmission.

FIGURE 4 is a view taken on broken line 4—4 of FIGURE 3 showing said distributing valve in elevation and with one cover plate removed.

FIGURE 5 is a view, taken on broken line 5—5 of FIGURE 3, showing in elevation the cover plate which is removed in FIGURE 4.

FIGURE 6 is a view in elevation showing a fragment of the peripheral portion of a rotor.

Like reference numerals refer to like parts throughout the several views.

For the purpose of illustration, I disclose a transmission having three power chambers but it will be understood that the transmission may be constructed to provide two or more power chambers.

My transmission herein disclosed comprises a hollow housing 10 of generally cylindrical internal shape which is internally provided with three angularly spaced apart arcuate wall sections 11 of smaller diameter which serve as rotor contacting parts and between which are three other angularly spaced apart arcuate wall sections 12 of larger diameter. The wall sections 12 cooperate with the sections 11 and with a rotor, hereinafter described, to form three power chambers 13, 14 and 15. Smoothly curved internal wall section 16 serves as cam like transition surfaces between the wall sections 11 of smaller diameter and the wall sections 12 of larger diameter.

A rotor 17 of generally cylindrical shape is rotatively disposed within the housing 10 and has a rigidly attached power shaft 19 which extends outwardly through and is journaled in suitable bearings in housing end plates 20, one of which is shown in FIGURE 2. The peripheral portion of the rotor is provided, at six equally spaced positions with pairs of transverse cylindrical bores or passageway 21. The outermost portions of the bores 21 intersect and are substantially tangent to the outer peripheral wall of the rotor. The two bores 21 of each pair are parallel and are relatively close together and an outwardly expanding rotor body section 22 of maximum diameter is left between each pair of bores 21. Rotor body sections 23 of greater width but of smaller diameter than the sections 22 are provided between the adjacent pairs of bores 21.

The reduced diameter of the section 23 provides the required clearance for swinging vanes, each of which is formed of a cylindrical pivot part 24 and a blade part 25. The blade part 25 is generally flat but has an external longitudinal curvature conforming to the wall curvature of the housing parts 11 and an internal longitudinal curvature conforming to the peripheral curvature of the rotor parts 23. The cylindrical part 24 of each vane fits snugly in one of the transverse bores 21 and the blade part 25 operates in the space between the periphery of the adjacent rotor section 23 and the internal wall of the housing 10. The blade parts 25 of the two vanes in each pair of bores extend in opposite directions so that one vane of each pair will be operative when the rotor is being driven in one direction and the other vane of the pair will be operative when the rotor is being driven in the opposite direction. A spring 26 is disposed under the blade part 25 of each vane and lightly urges the vane outwardly.

In the herein disclosed instance of a transmission having three power chambers 13, 14 and 15, six spaced apart ports 27 are provided in the wall of the housing 10 and communicate respectively with the end portions of said power chambers. Six fluid conduits 30, 31, 32, 33, 34, and 35 are communicatively connected respectively with the six ports 27.

To use this device as a reversible transmission it is necessary to connect the conduits 30 to 35 inclusive with fluid pressure supply means which includes a reversible valve so that fluid, such as oil, under pressure can be supplied selectively to three of the conduits leading to corresponding ends of power chambers 13, 14, and 15 and the other three conduits leading to opposite ends of said power chambers communicatively connected with an oil reservoir for the free exhaust of oil from these ends of the chambers. To provide for variable speed and variable power, it is further necessary to use selective means whereby the oil under pressure can be cut off from one or two of the power chambers as desired and whereby a bypass for oil is provided between the two ports of each power chamber so cut off. This may be accomplished in different ways and by different means.

FIGURES 2 to 5 disclose control means which can be used in connection with a typical dual engine power installation on a fishing boat for accomplishing this purpose.

In FIGURE 2, 36 and 37 are two engines of greater and lesser horsepower respectively, 39 and 40 are two pumps driven by the respective engines 36 and 37, 41 is an oil reservoir and 42 is conduit means connecting said reservoir 41 with the pumps 39 and 40. Pumps 39 and 40 are also connected, through check valves 43 and 44 respectively and by conduit means 45, with a reversing valve 46 of the type commonly known as a three-way valve. A return flow conduit 47 connects valve 46 with reservoir 41. Two other conduits 49 and 50 connect reversing valve 46 with manifold ports 51 and 52 respectively in one end plate 53 of a distributing valve 54. Obviously movement of the valve 46 will reverse the pressure flow and return flow of oil as respects manifolds 51 and 52. The distributing valve 54 has a housing 55 and another end plate 56 and has a valve member 57 with a shaft 59 and handle 60 by which said valve member 57 can be rotatively moved.

The conduits 30, 31 and 32 are connected respectively, with three ports 61, 62 and 63 in the end plate 56 of the distributing valve 54. The other three conduits 34, 35 and 33 are connected, respectively, with three other ports 64, 65 and 66 in said end plate 56. The valve member 57 is provided with three ports 67, 68 and 69, which are adapted to register at one end, with the manifold 52, and at the other end with ports 61, 62 and 63, in end plate 56, depending on the angular position of the valve member 57. Also the valve member 57 has three other ports 70, 71 and 72 adapted to register at one end with the manifold 51, and at the other end with the ports 64, 65 and 66 in the end plate 56. It will be understood that each manifold 51 and 52 is only large enough to span the three adjacent ports in the valve member 57 for one chosen position of said valve member, and that substantial rotary movement of said valve member away from this position will result in the closing off of one or more of the three ports of each group as respects the manifold with which the group registers.

The face of the valve member 57 which is in contact with the end plate 56 is provided with two cavities 76 and 75 which are connected with each other by a passageway 77. The cavities 76 and 75 are positioned to register with the ports 61 to 66 in the end plate 56 and these cavities and the passageway 77 cooperate in forming bypasses between the end portions of the power chambers 13, 14 and 15 as hereinafter explained.

If the valve member 57 is positioned so that three ports of each group in said member 57 register with three corresponding ports in the end plate 56 then oil under pressure will be supplied to one end of each power chamber 13, 14 and 15 and the other end of the power chamber will be in communication with the reservoir 41. This will result in the entire volume of oil delivered by one or both of the pumps 39 and 40 being equally divided between the three power chambers 13, 14 and 15 thereby providing maximum torque at slow speed.

If the valve member 57 is angularly moved, for instance in a clockwise direction, an amount equal to the distance between two of its adjacent ports the connections of power chamber 13 with the high pressure oil and with the oil reservoir 41 will be closed off and a bypass for oil in said chamber 13 will be opened through conduit 30, port 61, valve cavity 76, valve passageway 77, valve cavity 75, port 64 and conduit 34. Under these conditions all of the oil which is being pumped will be equally divided between the two power chambers 14 and 15 resulting in an increase of speed and a reduction of the torque delivered to rotor shaft 19. If said valve member 57 is angularly moved clockwise an amount equal to the distance between two of its adjacent ports then the power chamber 13 will still remain cut off from the supply of oil under pressure and the power chamber 14 will also be neutralized by cutting it off from the supply of oil under pressure and from the oil reservoir 41 and by connecting its conduits 31 and 35 through the distributing valve 54 to provide a bypass.

This transmission can be used in place of both the usual reverse gear and speed reduction gear on small boats, such as fishing boats. When so used it permits the use of more than one engine to propel the boat and makes it possible to use either or more than one of the engines at one time. Also the engines can be located in any part of the boat. The transmission can be built with two or more power chambers, as desired.

Obviously changes in construction of this device may be made within the scope of the following claim.

I claim:

1. A hydraulic power transmission comprising a tubular housing of generally cylindrical internal shape, said housing having at least two circumferentially spaced apart portions of smaller internal diameter and having portions of larger internal diameter extending between said portions of smaller internal diameter forming walls of power chambers, said housing portions of larger and smaller internal diameter being connected with each other by smoothly curved wall portions which are positioned substantially at the ends of the power chambers; a generally cylindrical rotor rotatively disposed within said housing and having a rigidly attached rotor shaft, said rotor having at least two circumferentially spaced apart portions of larger diameter adapted for sealing contact with the housing portions of smaller diameter and said rotor having portions of smaller diameter extending between said rotor portions of larger diameter and providing vane clearance between the rotor and the housing wall; a plurality of vanes carried by and pivotally connected with the peripheral portion of said rotor, each vane having a blade portion which is swingably movable between an idle position in which it lies flat against the rotor and a working position in which it extends at an incline between the rotor and the housing wall; a liquid reservoir; at least one pump having an intake connected with said reservoir a distributing valve; two liquid conduits connecting the respective end portions of each power chamber in said transmission housing with said distributing valve; two other liquid conduits connecting said distributing valve with said pump and said liquid reservoir respectively; a reversing valve interposed in said two other liquid conduits operable to reverse the connections between said distributing valve and said pump and reservoir, said distributing valve being operable to shut off the flow of liquid to and from at least one power chamber in the transmission housing and open a passageway through said distributing valve between the two end portions of each power chamber to and from which the flow of liquid is thus shut off.

References Cited

UNITED STATES PATENTS

| | | | |
|---|---|---|---|
| 604,960 | 5/1898 | Boris | 91—149 |
| 615,664 | 12/1898 | Dearing | 91—74 |
| 708,566 | 9/1902 | Lockerby | 91—149 |
| 833,588 | 10/1906 | Dabonville | 91—149 |
| 942,205 | 12/1909 | Johnson | 91—149 |
| 2,736,170 | 2/1956 | Huse | 91—413 X |
| 2,817,320 | 12/1957 | Osborn | 91—147 |

MARTIN P. SCHWADRON, *Primary Examiner.*

G. N. BAUM, *Assistant Examiner.*